2,814,638

PREPARATION OF SECONDARY ALCOHOL ESTERS OF PERFLUOROCARBOXYLIC ACIDS FROM OLEFINS

Jennings H. Jones, State College, Pa., assignor to Esso Research and Engineering Company, a corporation of Delaware No Drawing. Application October 18, 1955, Serial No. 541,304

7 Claims. (Cl. 260—485)

This invention relates to a process for converting certain branched olefins to the corresponding alcohols by a hydration step involving a minimum of isomerization or polymerization. More specifically, it relates to the hydration of branched secondary olefins such as 3-methyl-1-butene with perfluorocarboxylic acids such as trifluoroacetic acid, resulting in the selective formation of the corresponding secondary alcohol, notably 3-methyl-2-butanol.

The hydration of olefins such as ethylene or propylene in the presence of sulfuric acid is an old-established art. Similar hydration techniques have also been successfully applied in the preparation of certain higher alcohols. However, certain other higher alcohols corresponding to branched chain secondary olefins could not be heretofore made by this technique since sulfuric acid and similar previously used hydration catalysts caused extensive isomerization and polymerization of the more reactive olefins. Thus, for instance, when 3-methyl-1-butene is treated with solutions of sulfuric acid, polymerization occurs to a great extent and any hydration product consists almost exclusively of 2-methyl-2-butanol rather than 3-methyl-2-butanol, indicating that the olefin is first isomerized to trimethyl ethylene.

It has now been discovered that branched secondary olefins can be readily converted to the corresponding secondary alcohols with a minimum of isomerization or polymerization, provided that a perfluorocarboxylic acid is used in the reaction and the latter is carried out at a suitable temperature. More specifically, the invention is applicable to $C_5$ to $C_{16}$ branched secondary olefins which can be represented by the formula $$R-CH=CH-R'$$

wherein R is selected from the group consisting of branched chain alkyl radicals of 3 to 14 carbon atoms and of branched chain alkylene radicals joined with the ethylenic group to form a cycloolefin having a ring of 5 to 8 carbon atoms and a total of 6 to 16 carbon atoms, and R' is selected from the group consisting of hydrogen and straight and branched chain alkyl radicals of 1 to 11 carbon atoms. Examples of such olefins are 3-methyl-1-butene, 3-methyl-1-pentene, 4-methyl-1-pentene, 4-methyl-2-pentene, 3-ethyl-1-pentene, 3,4,4-trimethyl-1-pentene, 4,4-diisopropyl-2-pentene, 3-hexyl-4-octene, 3,5-diethyl-1-octene, 3-methyl-1-cyclopentene, 4-isopropyl-1-cyclohexene, 3,4-diethyl-1-cyclooctene, etc.

In other words, the present invention is of particular value for converting to alcohols, with no change in carbon skeleton, those branched chain secondary olefins of at least 5 carbon atoms or secondary cycloolefins of at least 6 carbon atoms which normally undergo isomerization or polymerization in the presence of mineral acids.

The alcohols obtained here are useful as special solvents, as motor fuel ingredients, and also in the preparation of ketones, ester plasticizers, etc.

The acids specifically useful herein are the perfluorocarboxylic acids, that is, carboxylic acids having all hydrogen atoms other than the carboxyl hydrogens replaced by fluorine. In particular, it has been discovered that trifluoroacetic, pentafluoropropionic, heptafluorobutyric, tetrafluorosuccinic, hexafluoroglutaric and similar saturated aliphatic perfluoroacids of 2 to 6 carbon atoms and 1 to 2 carboxyl groups can be reacted with the aforementioned type of olefins with a minimum of side reactions, and the resulting esters can then be converted into secondary alcohols corresponding to the original olefin structure, whereas a similar reaction with mineral acids results in extensive isomerization or polymerization and the predominant formation of products other than the desired alcohols.

The temperature at which the esterification reaction is best carried out depends somewhat on the particular combination of olefin and acid used, but generally will fall in the range of about +15° to 300° C. For instance, when secondary olefins such as 4-methyl-2-pentene are being treated with trifluoroacetic acid, temperatures such as 50 to 150° C. are advisable in order to speed up the esterification, and temperatures above 200° C. may be preferred when the secondary olefins are treated with the less reactive acids such as perfluorosuccinic. Of course, the determination of a suitable selectively effective temperature within the aforementioned range is a matter of simple routine from case to case. Accordingly, the expression "selectively effective temperature" will be understood herein to mean a temperature at which isomerization and polymerization reactions will be minimized in relation to the desired principal reaction.

The reaction pressure may be in the range of about 0 to 1000 or more p. s. i. g., e. g. about 0 to 100 p. s. i. g. Enough pressure is preferably used in each case to keep substantial or major proportions of the reagents in liquid phase at the chosen reaction temperature.

In carrying out the reaction it is desirable to use a molar excess of the fluoroacid with respect to the olefin. Thus, a practical operation may be run with about 1.1 to 2 moles of monobasic fluoroacid per mole of monoolefin. The acid may be added to the reaction either in substantially pure form or in the form of an aqueous solution of about 70% or more concentration. Other solvents such as methyl chloride or other low-boiling chloro- or chlorofluoroalkanes may also be present in the reaction mixture, particularly when a normally solid acid such as perfluorosuccinic or perfluoroglutaric is used. Sometimes it may also be advantageous to predissolve the solid acid in the corresponding, previously prepared ester. After termination of the reaction the resulting ester may be isolated from the reaction mixture by distillation, or it may be further converted in situ. The perfluoroester may be converted to alcohol by conventional techniques such as saponification with a base, or alcoholysis with a $C_1$ to $C_3$ alkanol, such as methanol, or by direct hydrolysis in the case of the lower alcohols. For the purposes of this case, "hydrolysis" will be understood as being generic to all of the aforementioned methods of converting the ester into the alcohol.

The alcohol product may then be further blended or converted as desired. For instance, a secondary alcohol can be oxidized in liquid phase with chromic acid or the like, or in vapor phase over known metal oxide catalysts such as zinc oxide or iron oxide, to form ketones of a type not readily available heretofore.

The invention will now be illustrated by specific examples. It will be noted that all amounts and proportions are expressed throughout on a weight basis unless otherwise indicated.

*Example 1*

A mixture of 51.8 grams (0.46 mole) of trifluoroacetic acid and 23.8 grams (0.34 mole) of 3-methyl-1-butene was placed in a small glass pressure flask and heated at a temperature of 65° C. for a period of 12 hours. During the period of heating the pressure dropped from 50 to 24 p. s. i. g. Titration of a sample of the reaction mixture at this point indicated that 58 percent of the olefin had reacted. The product, containing a mixture of the perfluoroacetate esters of 3-methyl-2-butanol and 2-methyl-2-butanol, was washed with water and saponified by refluxing with a slight excess of 4 percent sodium hydroxide solution. During the saponification period 2 grams of unreacted olefin, probably present in the mixture as a dissolved gas, collected in a cold trap connected to the vent line of the apparatus.

The product next was steam distilled and the organic layer appearing in the distillate was washed with several portions of water; 4.5 grams of a water-insoluble hydrocarbon portion remained. The water washings were combined with the aqueous distillate and the whole was saturated with salt; 15.5 grams of a mixture of alcohols was isolated. During the steam distillation treatment an additional 1 gram portion of unreacted olefin was collected in a cold trap; in addition, 0.2 gram of a hydrocarbon material was not distilled with steam and remained behind.

The alcoholic portion totaling 15.5 grams, equivalent to a yield of 89 percent based on the olefin reacting, possessed a refractive index, $n_D^{20}$, of 1.4067 and boiled over a range of about 100° to 115° C. Infrared analysis of a portion of the material indicated the presence of a 50:50 mixture of 2-methyl-2-butanol (B. P. 102° C.; $n_D^{20}$, 1.4052) and 3-methyl-2-butanol (B. P. 113.5° C.; $n_D^{20}$, 1.4090).

A portion (2.1 grams) of the alcoholic mixture was oxidized with dichromate and sulfuric acid and gave a ketone ($n_D^{20}$, 1.3897) which yielded a 2,4-dinitrophenylhydrazone which had a melting point of 122.9° to 123.9° C. (corrected). Mixed with an authentic sample of the 2,4-dinitro-phenylhydrazone of methyl isopropyl ketone, the sample had a melting point of 123.9° to 124.9° C., indicating essentially no depression in melting point. On the other hand, mixing with an authentic sample of the 2,4-dinitro-phenylhydrazone of acetone (M. P. 125° to 126° C.), depressed the melting point of the sample to 95° to 99° C. Thus, the ketone was methyl isopropyl ketone and the original alcohol it derived from must have been 3-methyl-2-butanol. The 2-methyl-2-butanol, present in the original alcohol product must have come from rearrangement of the 3-methyl-1-butene to trimethylethylene during the acid treatment, and of course, being a tertiary alcohol, decomposed upon oxidation. For this reason, it is preferable to separate the tertiary from the secondary alcohol, e. g. by close fractionation, before the secondary alcohol is oxidized.

This example demonstrates that 3-methyl-1-butene, a branched chain secondary olefin, can be converted to the corresponding alcohol and then to the ketone, methyl isopropyl ketone, in a yield of about 50 percent of the theoretical based on the amount of olefin reacting. The other product consisted of the tertiary alcohol, 2-methyl-2-butanol, which resulted from 2-methyl-2-butene produced from 2-methyl-1-butene by isomerization. This represents a useful process for producing either 3-methyl-2-butanol or methyl isopropyl ketone which are not otherwise readily available, except by reliance on the expensive Grignard reaction.

In this connection, it will be recalled that tertiary olefins such as 2-methyl-1-butene and 2-methyl-2-butene readily give nearly quantitative yields of tertiary amyl alcohol, 2-methyl-2-butanol, when using 80 to 90% sulfuric acid at 15° to 20° C. In contrast, however, the secondary olefin, 3-methyl-1-butene, in the presence of sulfuric acid under similar conditions yields mainly a polymer plus, due to isomerization, a trace of the tertiary 2-methyl-2-butanol, but no secondary alcohol. Preparation of methyl isopropyl ketone is impossible via this route.

Example 2

33 grams (0.39 mole) of 4-methyl-2-pentene and 85 grams (0.75 mole) of perfluoroacetic acid were heated in a pressure bottle at a temperature of 95° C. and at a maximum pressure of about 30 p. s. i. g. Titration of samples of the reaction product indicated that sufficient acid had been consumed after two hours to account for a conversion of 45 percent of the olefin feed. After 11 hours the olefin conversion reached 85.5 percent.

The reaction product, containing a mixture of the perfluoroacetate esters of 4-methyl-2-pentanol and 2-methyl-3-pentanol, then was washed with water to remove the excess acid and dried over sodium sulfate; 62 grams of organic ester remained. This amount was equivalent to 81 percent of the theoretical.

A portion totaling 49 grams (0.25 mole) of the ester from the above reaction was placed in the still of a small glass-packed fractionation column with 32 grams (1.0 mole) of methanol and 0.2 gram of metallic sodium. Distillation then was carried out and yielded the following fractions:

| Frac. No. | Weight, grams | B. P. range, ° C. (corrected) | R. I., $n_D^{20}$ | Contents |
|---|---|---|---|---|
| 1-4 | 28 | 41 | 1.295 | Methyl perfluoroacetate. |
| 5-9 | 22.4 | 64 | 1.3284 | Methanol. |
| 10 | 2.3 | 110-123 | 1.3982 | |
| 11 | 2.1 | 125 | 1.4125 | |
| 12 | 2.6 | 125 | 1.4130 | |
| 13 | 3.2 | 125 | 1.4120 | $C_6$-alcohols. |
| 14 | 1.7 | 125 | 1.4103 | |
| 15[1] | 6.3 | 130-136 | 1.4152 | |
| 16[1] | 2.5 | 136-142 | 1.4157 | |
| Residue | 3.0 | | | |

[1] Distillation completed in a simple side-arm distilling flask.

The methyl perfluoroacetate in fractions 1 to 4 totaled 28 grams or 0.22 mole which represented 88 percent of the theoretical amount expected from the alcoholysis.

The material in fractions 10 to 16 inclusive consisted of $C_6$ alcohols. Upon including the amount in the residue, the total weight of alcohols obtained was 23.7 grams which was equivalent to a yield of 94 percent of the theoretical based on the amount of ester used for the alcoholysis.

The formation of three different alcohols was theoretically possible in this hydration of 4-methyl-2-pentene. Secondary alcohols, 4-methyl-2-pentanol and 4-methyl-3-pentanol, ought to result if no isomerization of the double bond occurred in the presence of the perfluoroacid hydration catalyst. On the other hand, if the perfluoroacid catalyzed the isomerization of the olefin during the hydration in the manner of mineral acids such as sulfuric or phosphoric, then the principal product would be the tertiary alcohol, 2-methyl-2-pentanol. The properties of the three possible alcohols are listed below:

| Alcohol | B. P., ° C. | R. F., $n_D^{20}$ | 3,5-dinitrobenzoate derivative, M. P., ° C. |
|---|---|---|---|
| 4-Me-2-pentanol | 131.9 | 1.4011 | 65 |
| 4-Me-3-pentanol | 126.7 | 1.4168 | 85 |
| 2-Me-2-pentanol | 121.1 | 1.4113 | 72 |

By comparison with these values corresponding to the pure compounds, it is apparent from the distillation data of the hydration product given above that the product contained little, if any, of the tertiary alcohol. Further, the presence of a mixture of only the two secondary alcohols was conclusively determined by infrared spectrum of the material in a blend of fractions 11, 12 and 13 as compared with the spectra of pure samples of the two expected secondary alcohols.

Next a portion (5.6 grams, 54 milliequiv.) of the material in fractions 11 to 13 inclusive was oxidized with 27 ml. of a chromic acid solution (containing 4 milliequiv./ml.). The chromic acid solution was prepared by dissolving 10 grams of chromic anhydride in a solution of 8 ml. of concentrated sulfuric acid in 60 ml. of water. The oxidation was carried out by gently boiling the alcoholic sample with the chromic acid solution for about an hour and then distilling off the reaction product. In this manner 4.0 grams of a $C_6$-ketone product was produced which represented a yield of 75 percent of the theoretical.

The ketones expected from this oxidation were 4-methyl-2-pentanone and 4-methyl-3-pentanone (or 2-methyl-3-pentanone) which would form from the two secondary alcohols. The tertiary alcohol, if present, would have yielded degradation products, rather than any $C_6$-ketone. This further shows that the principal alcohols present in the product of the alcoholysis were secondary alcohols rather than the tertiary one, and that the perfluoroacid did not isomerize the olefin, at least to any appreciable extent.

A 2,4-dinitrophenyl hydrazone derivative was prepared from the $C_6$-ketone product isolated above and after several recrystallizations melted at 95 to 96° C. In comparison, the melting points of authentic derivatives of 4-methyl-2-pentanone and 2-methyl-3-pentanone were, respectively, 89 to 90° C. and 113° C.

The presence of 4-methyl-2-pentanone in the mixture was further confirmed by preparing a semicarbazone derivative from the $C_6$-ketone product. It possessed a melting point after several recrystallizations of 119 to 121° C., as compared with a melting point of 125 to 127° C. for an authentic sample of the semicarbazone of pure 4-methyl-2-pentanone. A mixed melting point of the semicarbazone product with the authentic sample did not depress the melting point. The semicarbazone of 2-methyl-3-pentanone melts at 95° C. and was separated from the higher melting isomer in the course of the recrystallizations. No comparably convenient method has been previously known for preparing this type of ketone.

The hydration of 4-methyl-2-pentene in the presence of perfluoroacetic acid was also repeated at 25° and 60° C., respectively. After 15 hours at 25° C., less than 6.5 percent of the acid had undergone reaction as determined by titration of a sample. Considering the excess acid present, this acid conversion was equivalent to less than 8 percent conversion of the olefin feed. When this mixture was next refluxed at a pot temperature of 60° C. for three hours, titration indicated that this still resulted in converting less than 14 percent of the olefin. It is thus apparent that 4-methyl-2-pentene is best hydrated at temperatures above about 75° C. when using trifluoroacetic acid as the catalyst.

By comparison, when 4-methyl-2-pentene was shaken at room temperature for a period of two hours either with an excess of 10 percent or 90 percent aqueous solutions of sulfuric acid, no appreciable reaction occurred between the olefin and the acid. Instead, the product consisted mainly of hydrocarbon dimers and trimers of the olefin.

Having described the general nature of the invention and given examples illustrative thereof, the scope of the invention is to be determined from the appended claims.

What is claimed is:

1. A process for converting, with a minimum of molecular rearrangement, an olefin of 5 to 16 carbon atoms and corresponding to the formula R—CH=CH—R′ wherein R is selected from the group consisting of branched chain alkyl radicals of 3 to 14 carbon atoms and of branched chain alkylene radicals joined with the ethylenic group to form a cycloolefin having a ring of 5 to 8 carbon atoms and a total of at least 6 carbon atoms, and R′ is selected from the group consisting of hydrogen and straight and branched chain alkyl radicals of 1 to 11 carbon atoms, which comprises mixing said olefin with a saturated aliphatic perfluorocarbon carboxylic acid containing 2 to 6 carbon atoms and 1 to 2 carboxyl groups per molecule and maintaining the resulting mixture at least partially in liquid phase at a selectively effective temperature between about 15° and 300° C. until the corresponding ester is formed.

2. A process according to claim 1 wherein the olefin is a branched secondary cycloolefin having a ring of 5 to 8 carbon atoms and a total of 6 to 16 carbon atoms, and wherein the reaction temperature is in the range between about 50° and 150° C.

3. A process according to claim 1 wherein the olefin contains 5 to 8 carbon atoms, the reaction temperature is between 50° and 150° C., and wherein a molecular excess of a monocarboxylic acid having the formula $C_nF_{2n+1}COOH$ is used, $n$ being an integer ranging from 1 to 3.

4. A process according to claim 3 wherein the olefin is 4-methyl-2-pentene.

5. A process according to claim 3 wherein the olefin is 3-methyl-1-butene.

6. A process according to claim 1 wherein the perfluoro-acid is normally solid and is used in the reaction in the form of a solution in the corresponding perfluoro-ester.

7. A process according to claim 3 wherein the acid is a dicarboxylic acid having the formula $$(CF_2)_n \cdot (COOH)_2$$

$n$ being an integer ranging from 1 to 3.

References Cited in the file of this patent

UNITED STATES PATENTS

| | | |
|---|---|---|
| 1,939,384 | Buc | Dec. 12, 1933 |
| 2,218,457 | Winans | Oct. 15, 1940 |
| 2,525,530 | Dickey et al. | Oct. 10, 1950 |
| 2,732,370 | Codding et al. | Jan. 24, 1956 |

OTHER REFERENCES

McBee et al.: Ind. Eng. Chem. 39 (1947), pp. 415–7.
Gryszkiewicz-Trochimowski et al.: Bull. Soc. Chim. France, 1953, pp. 462–5.